Dec. 15, 1964

N. LAING 3,161,348

HIGH-OUTPUT BLOWER

Filed Dec. 9, 1957

INVENTOR.
NIKOLAUS LAING
BY
Bailey, Stephens & Huettig
ATTORNEYS.

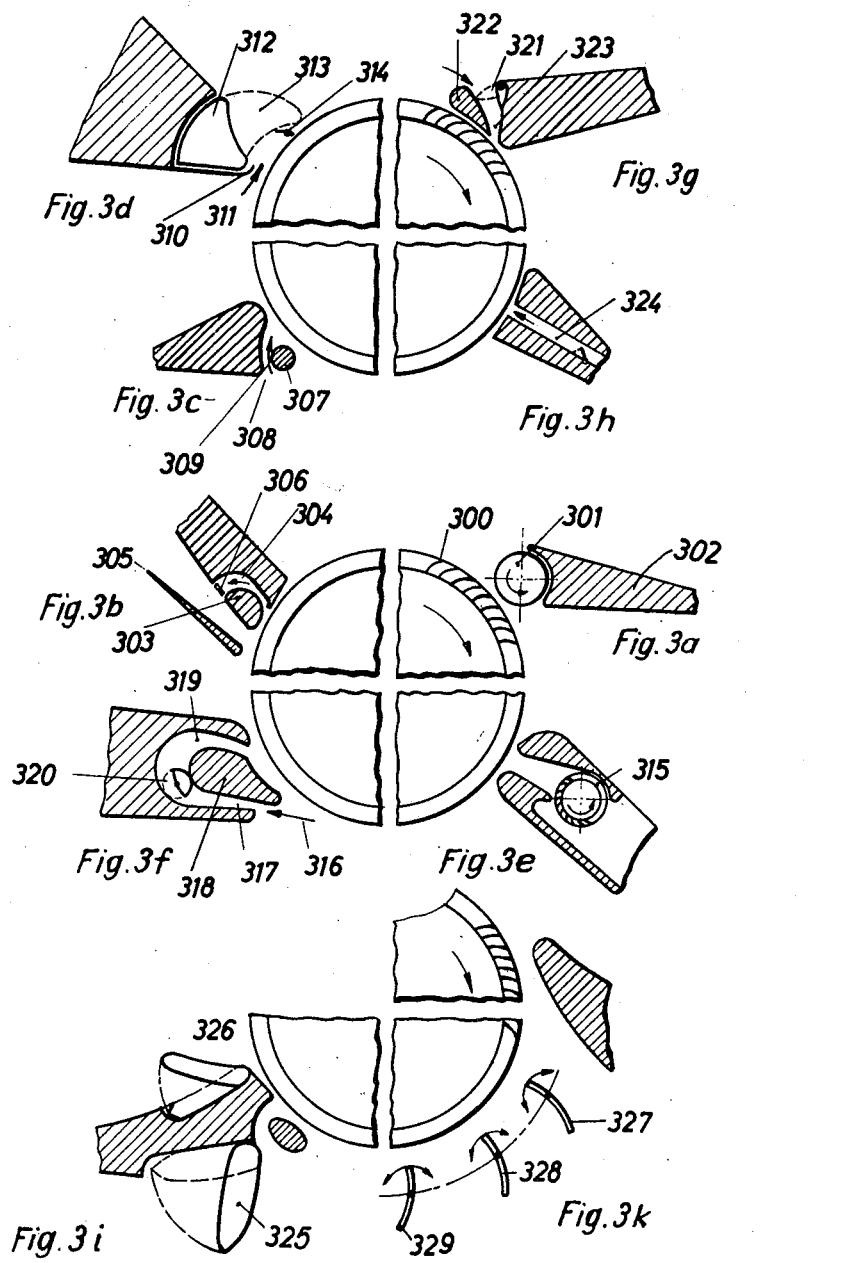

United States Patent Office 3,161,348
Patented Dec. 15, 1964

3,161,348
HIGH-OUTPUT BLOWER
Nikolaus Laing, 14 Albrecht-Duerer-Weg,
Stuttgart, Germany
Filed Dec. 9, 1957, Ser. No. 701,643
1 Claim. (Cl. 230—125)

This invention relates to thrust means for aircraft and more particularly to the use of power driven blowers for providing the forward thrust for aircraft.

Besides the employment of propellers in creating forward thrust for aircraft, jet power plants are also used for the purpose which, if a large rate of cold air flow is involved, are designed either as encased axial blowers, as radial blowers, or as diametral blowers. It has also been proposed to use blower rotors having a flow transverse to their axis, in which the sector of the rotor moving against the direction of flow is not participating in the impulse exchange. The main importance of jet blowers creating forward thrust for aircraft is their effectiveness.

In comparing kinetic flow machines, the study of blow forces made nondimensional provides an illustrative picture. Therefore, the following values, which have been made nondimensional, provide an illustrative picture of flow characteristics, and are defined as follows:

$$\eta = \frac{\text{hydraulic output}}{\text{mech. output}} \quad \text{(efficiency)}$$

$$\psi = \frac{\text{total pressure}}{\text{of peripheral speed conf. speed pressure}} \quad \text{pressure number}$$

$$\varphi = \frac{\text{rate of flow}}{\text{comp. machine surface}} \quad \frac{\text{delivery number}}{\text{peripheral speed}}$$

$$\tau = \frac{\text{static pressure}}{\text{total pressure}} \quad \text{degree of reaction}$$

$$c_s = \frac{\text{thrust}}{2 \cdot \text{delivery surface} \cdot c^2} \quad \text{thrust coefficient}$$

$\varphi \cdot \psi =$ power flow $\dfrac{1}{\varphi \cdot \psi}$ characteristic for type sizes According to the above, forward thrust blowers require the most favorable thrust coefficient; = values possible.

These demands are met to a great extent by cross flow drum rotors, in which the rate of flow between the two successive admissions is controlled by a forced flow, preferably through the field of a potential swirl. Thus, the invention relates to aircraft using jet blowers of the type in which cross-flow, circulation-controlled drum rotors are employed and in which admission covers practically the entire circumference.

FIGS. 3a to 3k show diagramatically various swirl creators;

FIG. 1 illustrates the principle of this type of kinetic flow machine and shows the direction of the air flow through a rotor where, by means of equipment described later in these pages, potential swirls are built up inside the drum rotor with their axis running parallel to the machine axes.

Figure 1A:
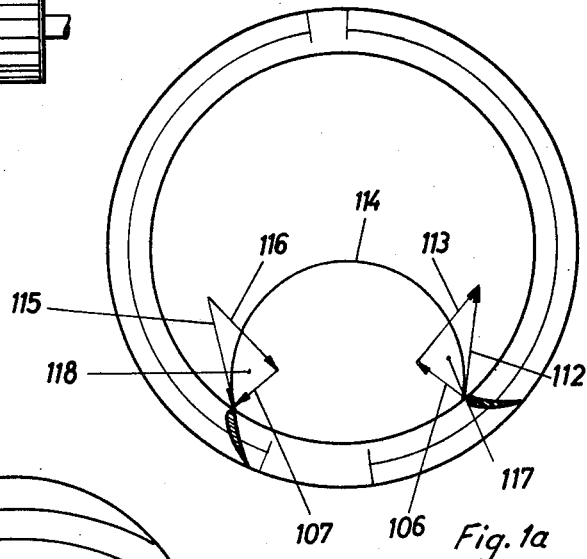
FIG. 1a is a diagram explanatory of FIG. 1.
Figure 1:
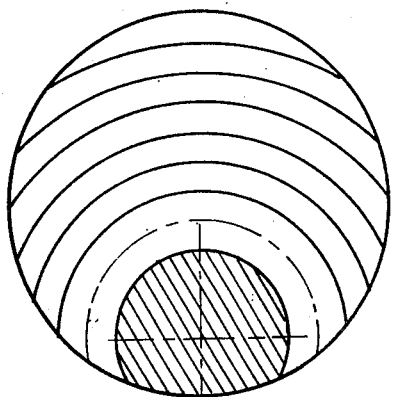
FIG. 1 shows the principle of a machine embodying the invention.

FIG. 1a illustrates in vector form the parameters decisive for the geometrical shape of the blade canal and which vectors have been added in such a manner that the relative speed vector resulting at the inlet end behind the cascade out of the absolute speed 112 provided by the flow line 114 of the potential swirl and the peripheral speed 113 at the outlet triangle 117 during the first passage through the cascade, and simultaneously the relative speed vector 107 of the inlet triangle 118, resulting from the absolute speed 115 provided by the flow line 114 and the peripheral speed 116, will coincide during the second passage through the cascade with the vectors of the flow lines of the rotational field provided for those ranges.

Figure 2:
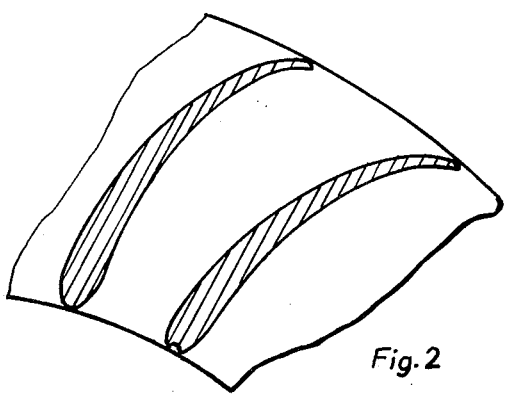
FIG. 2 shows a rotor arrangement embodying the invention.

FIG. 2. According to the invention the blade channels may be designed such that the channel cross sections taper down during one passage which means that during impulse exchange the machine will operate within the range of accelerated and therefore separation-free flow. Therefore, a blower designed according to the invention leaves complete freedom in the selection of the degree of conversion, and extensive freedom in the adjustment of the inlet conditions. The invention provides for selection of the adjustment angle of the blades in such a manner that breaks within the cascade range are just on the verge of occurring when the impulse exchange takes place at retarded flow, which guarantees highest efficiency of flow, and which in turn will lead to favorable characteristics in respect of the blades constantly contacted throughout their length.

FIGS. 3a to 3k show in a diagrammatic sketch various swirl creators which are simultaneously the partition walls between inlet and outlet end. To create swirl control according to the invention the following principles are basically suited:

(A) The creation of fictive swirls having a direction of rotation contrary to the direction of rotation of the potential swirl by means of suitable shaped edges, cylindrical guide bodies, or rotating cylinders.

(B) The creation of an accelerated partial flow by the cascade in such a manner that the partial flow which penetrates the cascade comes within the range of the core periphery.

(C) Sucking off of a partial flow emerging from the cascade.

Control of the tangential machine is effected by influencing the rotational field in unfavorable relation and may be performed by all measures which lead to an increase of the core diameter or to a shifting of the core towards the center of the rotor, as well as to a twisting of the rotational field toward the inlet or outlet end.

FIG. 3a shows a cylinder 301 running about the axis of its shaft at high speed and mounted parallel to cascade 300, the cylinder being the end of partition wall 302.

FIG. 3b shows a swirl creator working on the same principle, in which the cylindrical flow body 303 is also circumcirculated in a direction of rotation opposite to the potential swirl in the direction of the arrow 304. In the nozzle 305 located at the pressure end a strong underpressure is created in the range of channel opening 306 to maintain the circumcirculation.

FIG. 3c illustrates a further swirl creator which also creates a fictive swirl by circumcirculating the body 307. A partial flow runs through channel 308 in the direction of the arrow 309 and is then sucked up by the blower which in this case operates with a negative total reaction degree.

FIG. 3d illustrates a further embodiment of a swirl creator in which edge 310 is circumcirculated in the direction of arrow 311. If the molded body 312 is swivel-mounted, a partial flow will be returned through the cascade in the direction of arrow 314 if the said body is in the position indicated by the dashes, which conforms with the swirl modulation according to FIG. 3b. By swiveling part 312, the rate of flow may be changed within wide limits.

FIG. 3e illustrates a swirl creator in which the partial flow passing through the cascade is conveyed by means of a small tangential blower rotor 315 mounted on a shaft. By changing the setting of the throttle or the speed of the auxiliary blower, the main blower can be controlled.

FIG. 3f illustrates a swirl creator arrangement working on the same principle in which a partial flow 316 is received at the pressure end and is then changed into pressure in a diffusor 317, reversed in an elbow 318 and again accelerated in the nozzle 319. By changing the flap position of the throttle 320 this embodiment permits a change of the rate of flow and of the throttle number.

FIG. 3g shows a similar shape in which, however, an accelerated partial flow which is adjustable by means of flap 321, is created between the flow body 322 and the partition wall 323.

FIG. 3h illustrates a swirl creator in which a partial flow is sucked off through channel 324 by means of a special blower, for example, a gas turbine. The position of the swirl changes in dependence of the quantities sucked off.

FIG. 3i shows a swirl creator in which the rotational field near the core of the swirl is influenced by flap 325 at the pressure end and/or by flap 326 at the suction end.

FIG. 3k shows a swirl creator arrangement with pretwist blades 327, 328, 329 which by means of a swivel motion permit a change of inflow conditions and with it also a shift of the rotational field.

Figure 4:
FIG. 4 shows another type of rotor according to the invention.

FIG. 4 shows a drum rotor according to the invention in which intermediate disks 40 are arranged close together and axially displaced in relation to each other for the purpose of supporting the blades 41. Instead of intermediate disks, rings may be employed, preferably alternating with intermediate disks.

Figure 5:
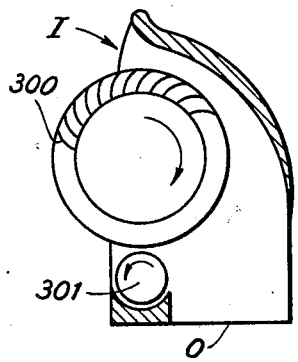
FIG. 5 shows still another embodiment of the invention.

FIG. 5 shows in cross-section a blower utilizing a swirl creator of the type shown in FIG. 3a. The intake I is at the upper right and the outlet O at the bottom. Rotor 300 and swirl producer 301 are similar to those of FIG. 3a. The swirl producer separates the suction or intake and the outlet or pressure openings.

What I claim is:

Blower for motor driven aircraft for the acceleration of air for the production of thrust forces, comprising a pair of discs mounted coaxially for rotation in spaced parallel planes, blades carried by the discs and extending from one to the other between the peripheries thereof, constituting a drum and leaving the center portion free, means partially enclosing the exterior of the drum in two spaced areas to provide suction and pressure openings therebetween, and guiding means inducing a potential swirl inside the rotor, the field of this swirl controlling the throughout between the first and the second passages of the air through the blades, the guiding means separating the suction and the pressure openings and constituting a swirl creator, the swirl creator including an at least partly circular, cylindrical body and means to rotate said body in a direction to create a fictive rotary swirl rotating contrary to the control swirl.

References Cited by the Examiner

UNITED STATES PATENTS

| | | | |
|---|---|---|---|
| 1,893,857 | 1/33 | Buck | 230—125 |
| 2,523,938 | 9/50 | Berliner | 244—73 X |
| 2,658,700 | 11/53 | Howell | 230—125 |
| 2,942,773 | 6/60 | Eck | 230—125 |
| 3,033,441 | 5/62 | Coester | 230—125 |

FOREIGN PATENTS 291,007   8/28   Great Britain.

LAURENCE V. EFNER, *Primary Examiner.*

EMILE PAUL, BRITTON BUCHLER, JOSEPH H. BRANSON, Jr. *Examiners.*